(12) United States Patent
Lehtinen et al.

(10) Patent No.: US 6,542,606 B1
(45) Date of Patent: Apr. 1, 2003

(54) PORTABLE COMMUNICATION DEVICE

(75) Inventors: Kari Lehtinen, Tampere (FI); Jouko Rytkönen, Tampere (FI); Reijo Paajanen, Tampere (FI); Toni Sormunen, Lempäälä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/552,838

(22) Filed: Apr. 20, 2000

(30) Foreign Application Priority Data

Apr. 22, 1999 (FI) .................................................. 990908

(51) Int. Cl.⁷ .............................................. H04M 1/00
(52) U.S. Cl. ................................................. 379/433.05
(58) Field of Search ....................... 379/433.12, 433.13, 379/433.05, 433.06, 433.07; 455/575, 90

(56) References Cited

U.S. PATENT DOCUMENTS

| 5,384,844 A | 1/1995 | Rydbeck ..................... 379/433 |
| 5,673,314 A | 9/1997 | Olkoski et al. ............. 379/433 |

FOREIGN PATENT DOCUMENTS

| EP | 0492748 A2 | 7/1992 |
| GB | 2328347 | 2/1999 |
| WO | WO 97/12470 | 4/1997 |
| WO | WO 98/15094 | 4/1998 |
| WO | WO 98/19434 | 5/1998 |

OTHER PUBLICATIONS

Patent Abstracts of Japan, document No.: JP9026834, Jan. 28, 1997.

Primary Examiner—Jack Chiang
(74) Attorney, Agent, or Firm—Perman & Green, LLP

(57) ABSTRACT

A portable communication device (1) comprising a first part (2); a second part (3); and coupling hinge (4) for pivotably coupling the first (2) and the second part (3). The device further comprises a connecting element (6) of the first part on a surface of the first part (2); a connecting element (13) of the second part on a surface of the second part (3); and said connecting elements (6, 13) are positioned to be against each other for enabling a mutual connection when the first part and the second part are in the closed position. Allows robustness and straightforward assembly at the manufacturing stage, and provides a structure that is lean, durable and easily accessible for maintenance.

20 Claims, 6 Drawing Sheets

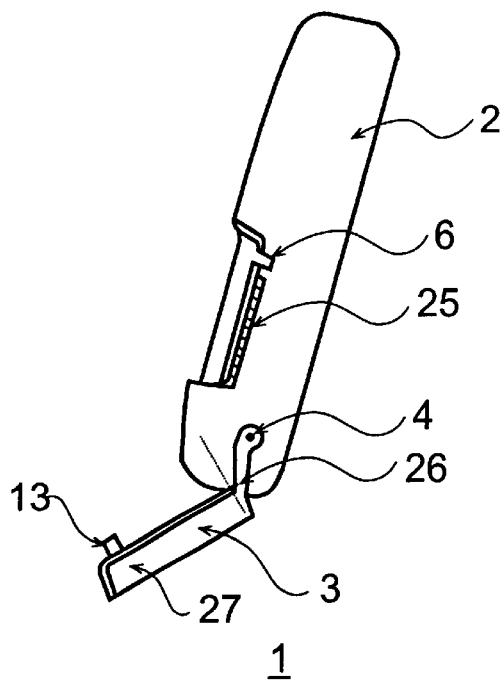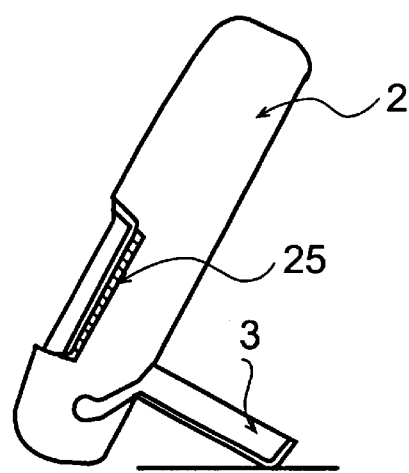
Fig 4a   Fig 4b
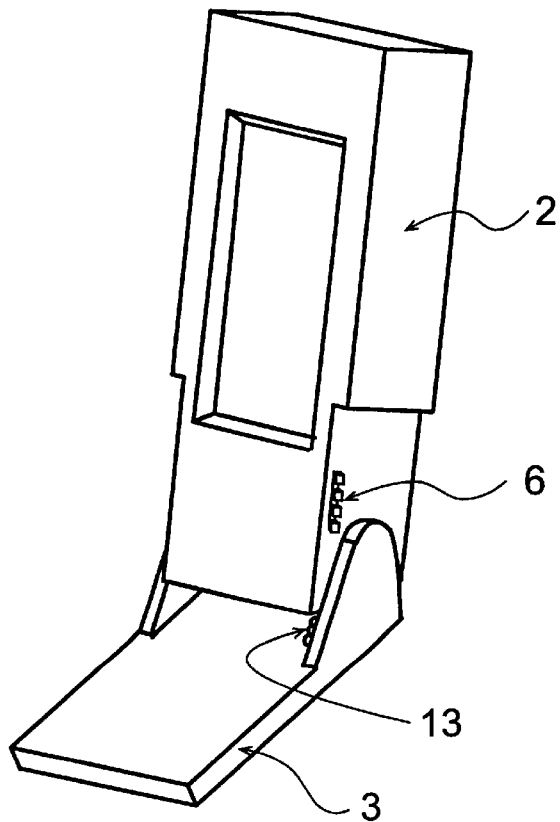
Fig 6 a)

b)

PORTABLE COMMUNICATION DEVICE

FIELD OF THE INVENTION

The present invention relates to telecommunications and especially to a portable communication device.

BACKGROUND OF THE INVENTION

The trend in telecommunications is towards a collaboration of different media types, e.g. voice, data and video. In consequence, the use and configuration of communication devices is diversifying, and especially a need for a sizeable display has increased. A screen is a sensitive element and it is therefore preferably arranged on a surface of the device that can be covered when the display is not accessed, e.g. when the device is in a pocket. Even without any sensitive components in the inner surfaces, a structure with some kind of moving housing is often preferred since it allows smaller design and protects privacy of a discussion when opened.

One outcome of such preferences is a communication device with a two-part structure comprising electronic circuitry in both of the parts, e.g. a user interface in the other part and control means in the other part. A coupling mechanism is used to couple the parts together and some type of hinging allowing the two parts to be pivoted into open and closed positions is used. To enable communication between the parts, a connection must exist. To facilitate this some arrangements in the coupling means are typically required.

In prior art solutions the connection between the first part and the second part is generally implemented using a cable or a foil extended between the two parts. A cable is typically thread trough a hinge that couples the two parts together in a folding manner (e.g. Nokia 9110 Communicator). A foil is flexible and typically folded loosely to the joint to prevent strains when the two parts are moving. Such structures are relatively easy to implement and are reasonably durable when the pivoting movement of the two parts is limited to opening angles less than 180 degrees. With larger movements, e.g. when the other part is pivotable to an opening angle greater than 180 degrees, the foils and cables are exposed to bigger strains and wear and tend to break easily. Furthermore, the assembly of prior art connectors is precision work and generates costs in manufacture. Being integrated inside the structures of the body, service operations for prior art connectors necessarily require some dismantling of the device.

SUMMARY OF THE INVENTION

Now a communication device has been invented where the above noted problems in connecting two movable parts of the device are obviated or at least mitigated. According to the first aspect of the invention a communication device comprises a first part and a second part; coupling means for coupling the first and the second part and allowing a mutual movement about a hinged joint to at least an open position and a closed position; a connecting element of the first part on a surface of the first part; a connecting element of the second part on a surface of the second part, and said connecting elements are positioned to be against each other for enabling a mutual connection when the first part and the second part are in the closed position. It is characteristic for the communication device according to the invention that it further comprises a keypad on the surface of the second part and the connection is arranged to deliver signals between the keypad on the surface of the second part and the first part.

In the invented solution each part comprises a connecting element that is arranged on a surface of the part. When the parts are in a closed position, the two connecting elements are positioned against each other and a mutual connection is possible. When the two parts are not in a closed position, the elements are not against each other and therefore no connection through these connecting elements exists. Here the expression against each other comprises, in addition to arrangements with direct physical contact, also arrangements where the distance and mutual positioning between the connecting elements allows a connection (e.g. optical connection) between the connecting elements.

The invented solution allows robustness and straightforward assembly at the manufacturing stage, and provides a structure that is lean, durable and easily accessible for maintenance. Furthermore, the electrical connection between the two parts exists only when they are in a closed position. When the two parts are in an open position, the signals to and from the user interface are not delivered and thus the solution acts also as a mechanism for controlling the operating mode of the user interface according to the mutual position of the two parts of the device.

BRIEF DESCRIPTION OF THE DRAWINGS

For a better understanding of the present invention and in order to show how the same may be carried into effect reference will now be made, by way of example, to the accompanying drawings, in which:

FIGS. 4a to 4b illustrate another embodiment for the invented portable communication device;

FIG. 6 illustrates an embodiment with an alternative structure and positioning of the connecting elements;

DETAILED DESCRIPTION

Figure 1C:
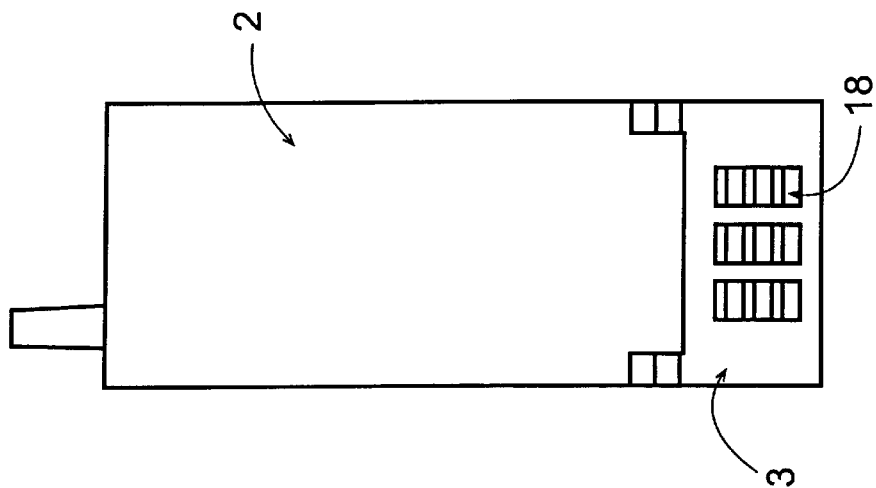
FIGS. 1a to 1c illustrate various views of a mobile communication device 1 according to the invention.
Figure 1B:
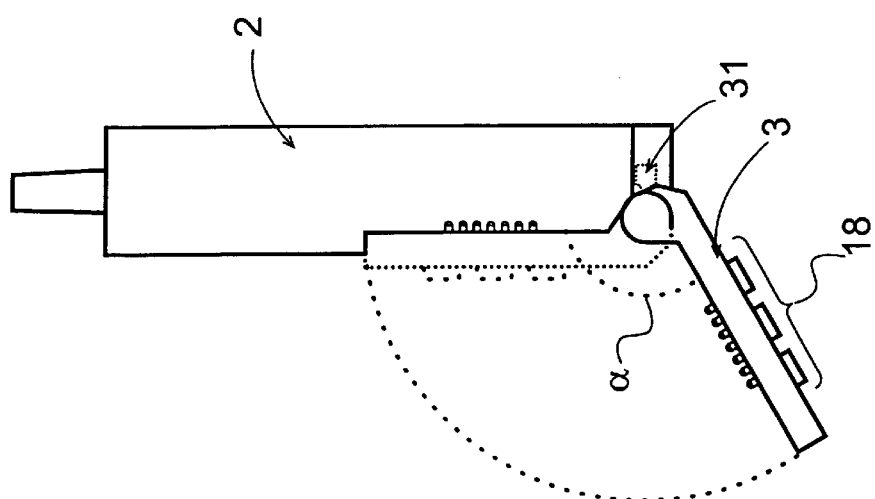
Figure 1A:
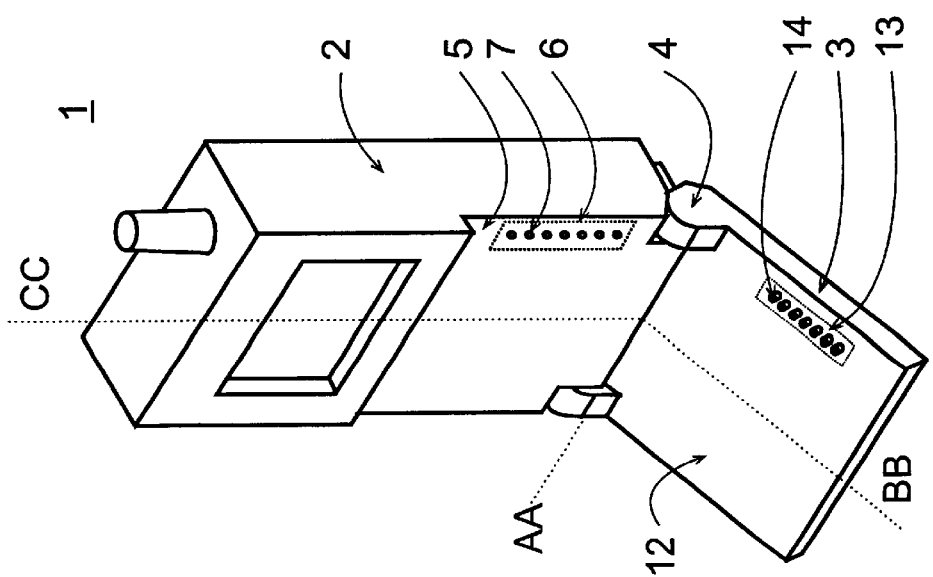

FIG. 1a to 1c illustrate various views of a mobile communication device 1 according to the invention. The communication device divides into two structural parts. In the embodiment shown here the first part comprises a main body 2, which houses most of the electronic circuitry for controlling the device 1 together with a power supply battery. The second part comprises a lid or a flap 3 pivotably coupled to a lower edge region of the body 2. The coupling means comprise a hinge 4 such that the lid 3 can be rotated about a hinge axis AA which is preferably perpendicular to the longitudinal axes BB of the lid 3 and CC of the body 2.

Figure 2C:
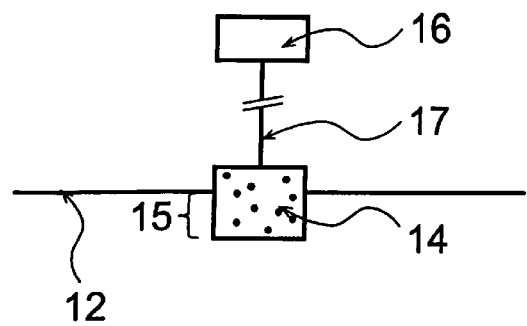
FIGS. 2a, 2b and 2c illustrate an embodiment for the first and second connecting elements.
Figure 2A:
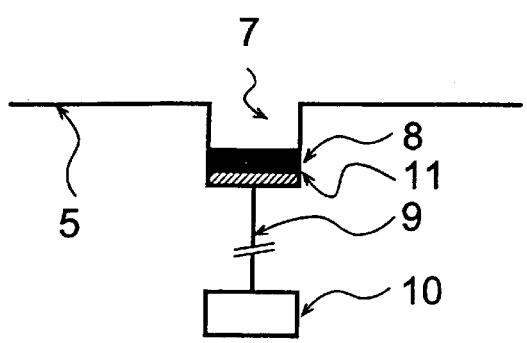

On the front surface 5 of the main body 2 there is arranged a first connecting element 6 that in the embodiment shown herein comprises a number of slots having a connector in the bottom of the slot. The first connecting element 6 thereby forms a female connector. In FIG. 2a the structure of a slot 7 of the first connecting element 6 is shown in more detail. The front surface of the first part 5 comprises a slot that has a certain shape and a certain depth. Opposite the opening of the slot there is arranged a connector 8 made of electrically conductive material and wired to a circuitry 10 in the first part of the communication device by lines 9. To alleviate the tolerances, an elastic element 11 e.g. a spring or a bend or a cushion-like structure of elastic material is preferably arranged to the connector for facilitating adjustment of the connector in the upward and downward directions inside the slot.

Referring back to FIG. 1a, on the rear surface of the second part 12 there is arranged a second connecting element 13 that in the embodiment shown herein comprises a number of pins 14 protruding from the surface 12. The second connecting element 13 thereby forms a male connector. In FIG. 2c also the structure of a pin 14 in a second connecting element 13 is shown in more detail. The pin 14 is made of electrically conductive material and has a size and shape corresponding to the slot 7 in the first connecting element. When the front surface 5 of the first part and the rear surface 12 of the second part are brought close to each other and the distance between the surfaces becomes less than the height of the protruding part 15 of the pin, the pin 14 will push into the slot 7. The pin is wired to a circuitry 16 in the second part of the communication device by lines 17.

Figure 2B:
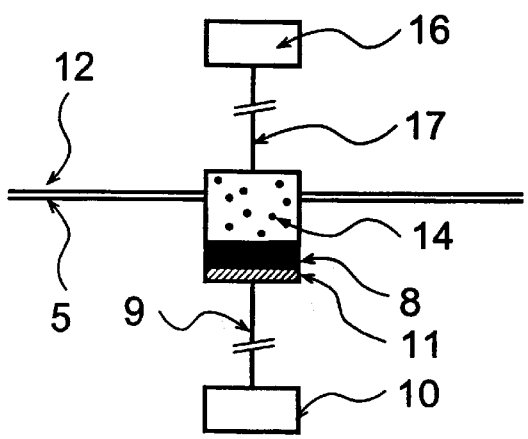

In FIG. 1b a side perspective view of the device 1 is shown. When the device 1 is pivoted to an open position with an opening angle α between the first part and the second part, the first connecting element 6 and the second connecting element 13 are not in contact with each other. When the parts are pivoted so that the opening angle α decreases, at a certain point the pins 14 of the second connecting element 13 start pushing into the slots 7 of the first connecting element 6 and eventually get into contact with the connectors 8 inside the slots 7, as shown in FIG. 2b. As the contact is reached an electrical connection is established between the circuitry in the first and in the second part of the device, here the main body 2 and the lid 3.

In FIG. 1c a rear perspective view of the device 1 when the device is in an open position is shown. As can be seen in FIG. 1c, the second part houses a user interface 18 that is accessible even when the device is in a closed position, i.e. when the lid is closed. In this embodiment on the front surface of the lid 3 (i.e. the surface that is accessible when the lid is in a closed position) there is arranged a set of data entry keys. Said keys comprise a set of numeric keys and telephone dialing control keys including "off-hook", "on-hook", control keys and memory recall keys, collectively termed a "telephone keypad". It will be apparent that with the lid 3 in the closed position, the device appears similar to that of a conventional cellular telephone and a user is able to control the making and receiving of the calls using the user interface 18.

In the open position the connection elements on the first and the second part of the device are not against each other and thus the first and the second part are not connected. In the closed position the first and second connecting elements establish an electrical connection and thus provide a connection between the first and the second part. In this embodiment, when the lid 3 is open the data entry keys of the user interface 18 are not connected to the main body 2 of the device 1 and are preferably disabled. In a closed position the main body 2 and the lid 3 are electrically connected and the signals between the user interface and the main body are transferred through the first 6 and the second connecting element 13.

Figure 3:
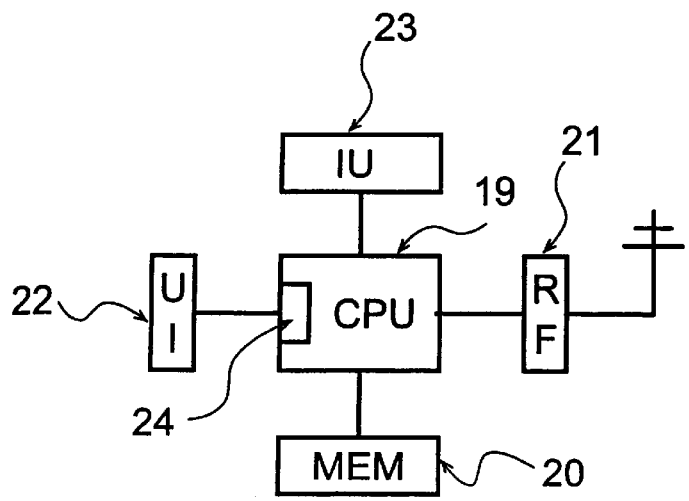
FIG. 3 illustrates an embodiment for the invented portable communication device.

As an example of a communication device a mobile terminal of a mobile communication system is presented. The functional structure of the mobile terminal according to the invention is by far that of a traditional mobile terminal earlier known to a person skilled in the art. Referring to FIG. 3, a Central Processing Unit (CPU) 19 controls the blocks responsible for the mobile station's different functions: a Memory (MEM) 20, a Radio Frequency block (RF) 21, a User Interface (UI) 22 and an Interface Unit (IU) 23. CPU is typically implemented with one or more functionally inter-working microprocessors and software loaded from the memory by the operating system when the device is switched on. The memory preferably comprises a ROM (Read Only Memory), a RAM (Random Access Memory) and is generally supplemented with memory supplied with an applicable User Identification Module. The CPU 19 controls the RF block 21 for transmitting and receiving messages on the radio path. Communication with the user is managed by the UI 22, which typically comprises units like a loudspeaker, a display and a keyboard. The Interface Unit 23 is the link to a data processing unit, which may be an integrated data processor or an external data processing equipment.

The CPU 19 comprises one or more drivers, that perform low-level input-output functions for input-output devices. In the present embodiment the CPU of the device comprises a keyboard driver 24 which performs input-output functions for the set of data entry keys on the lid 3. The driver 24 can be realised in a separate circuitry in the second part wherein the electrical connection provided by the first and the second connecting means is used to connect said circuitry in the second part with the CPU 19 in the first part. The driver 24 can also be implemented in the CPU 19 wherein the electrical connection provided by the first and the second connecting means is used to connect the CPU 19 in the first part with the user interface 22 in the second part. The driver 24 can also be implemented in both parts and then be multiplexed according to the different operating modes of the device.

A large number of equivalent variants to the embodiment shown here can be generated. Any type of wireless communication device is applicable, among others a mobile station providing access to a cellular network or e.g. via a company LAN to IP-network, a wireless two-way pager, a wireless personal digital assistant or a wireless telephone operating in home environment. The second part housing the user interface can be a simple flap as presented in the embodiment or it can comprise circuitry for implementing more of the functionalities of the whole device, depending on the embodiment. The coupling between the two parts can be arranged on either of the ends of an elongate first part or a second part, as shown in the embodiment of FIG. 1a to 1c, or they can be arranged to either of the sides of the elongate first part and second part, as in a Nokia 9110 Communicator.

In FIGS. 4a and 4b a further structure and thus an alternative coupling mechanism for the first and the second parts is presented. In FIGS. 4a and 4b the side perspective view of the device 1 is shown with two different opening angles α. The hinge 4 is arranged so that the pivot axis is at a distance of the lower edge region of the body 2. The lid 3 comprises an arm part 26 for extending the lid to a distance from the hinge 4 for enabling the pivoting movement around the surface of the bottom part of the body 2. The lid 3 also comprises a cover part 27 that is in the closed position arranged to cover the front surface of the first part 5 and in the open position to extend between the body 2 and a surface where the device is standing thereby acting as a support for holding the device 1 in a standing position. The body 2 is preferably provided with a recess in its surface such that when the lid 3 is closed over the body 2 the front surfaces of the body 2 and the front surface of the lid 3 are flush with one another.

On a front surface 5 of the body 2 there is provided a second user interface element 25, e.g. a keyboard, a screen, a touchscreen or any combination of them. When the lid 3 is in the closed position, it covers at least part of the second user interface element 25 and thus provides protection against mechanical wearing and against impulses that can be misinterpreted as user commands. Protection against mechanical wearing is important especially when the user interface element 25 comprises sensitive components as a liquid chrystal display or a touchschreen. Protection against unwanted external impulses is important especially when the user interface element 25 comprises a touchscreen wherein user commands are input by pressing certain areas of the touchscreen. According to the invention the rear surface of the lid houses a second connecting element 13 and the front surface of the body houses a first connecting element 6. As the lid is pivoted against the body 2 to a closed position the first connecting element 6 and the second connecting element 13 form an electrical connection for delivering the signals from the data entry keys in the first part to the circuitry in the second part. Especially with such a coupling mechanism, which allows an opening angle α greater than 180 degrees between the two parts, the conventional solution using cables and foils is not satisfactory. The large pivoting movement of the lid 3 required by both protecting the touchscreen and providing a stand for the device would expose the connecting cables and foils to excessive mechanical strains and friction and therefore make them susceptible for rapid wear and ruptures.

Figure 5C:
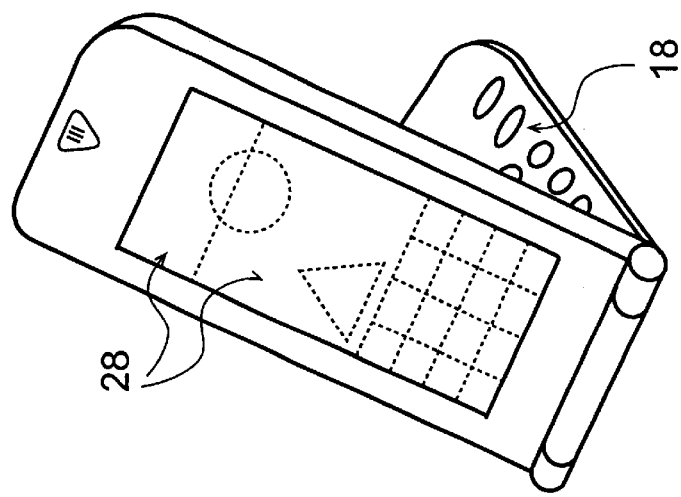
FIGS. 5a to 5c illustrate another embodiment for the invented portable communication device.
Figure 5B:
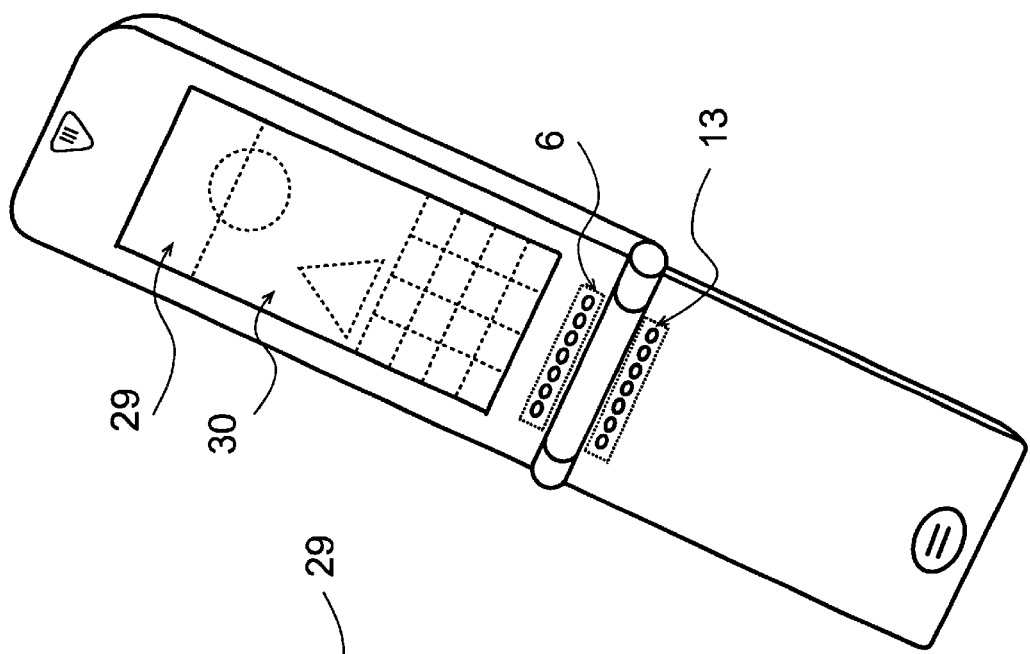
Figure 5A:
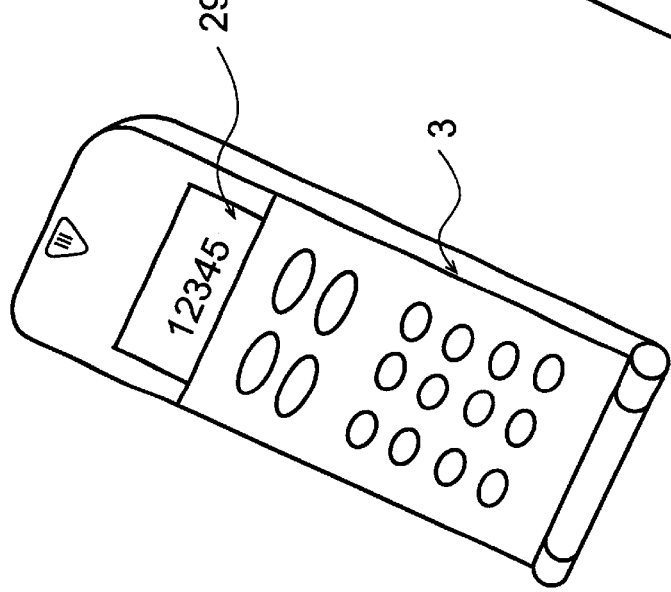

In FIGS. 5a to 5c a further embodiment for the coupling between the first and the second part is presented. In this embodiment the second user interface 25 on the front surface 5 of the body 2 comprises a touchscreen 28. When the lid 3 is in the closed position as shown in FIG. 5a, it leaves a first part 29 of the touchscreen visible to the user and covers the second part 30 of the touchscreen. When the lid 3 is in a closed position the second part of the touchscreen 30 can be operated in a power saving mode and the first part of the touchscreen 29 can operate as a conventional display element. On the front surface of the lid 3 there is a set of data entry keys 18. When the lid 3 is in the intermediate position as shown in FIG. 5b or in a standing position as shown in FIG. 5c, the first 29 and the second 30 part of the touchscreen 28 are visible to the user, and the keypad 18 is inaccessible. In front surface of the body 2 there is the first connecting element 6 and in the rear surface of the lid 3 there is the second connecting element 13 as described earlier. When the body 2 and the lid 3 are in a closed position the connecting elements are in contact and a connection between them exists. In the intermediate position and in the standing position, the connecting elements are not against each other and no connection through them exists. A combination of one user interface on a surface of the second part and another, potentially sensitive user interface on the surface of the first part and the second part moving with a large opening angle to provide a stand for the device emphasises the importance of the invention as reliable and durable means for delivering the signals between the data entry keys 18 on the lid 3 and the circuitry in the body.

Figures 7A, 7B:
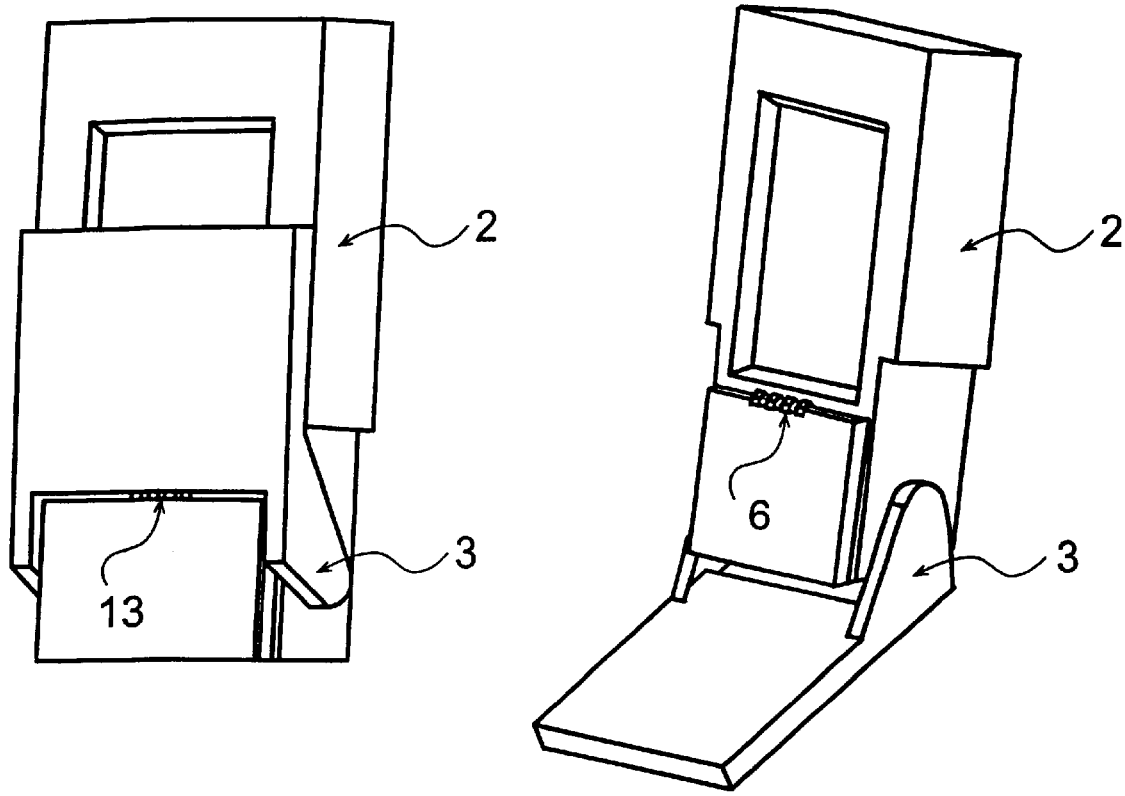
FIGS. 7a and 7b illustrate an embodiment with another alternative structure and positioning of the connecting elements.

In FIG. 6 an alternative structure and positioning for the connecting elements is shown. The first part 2 of the device is provided with a recess in its lower surface such that when the first and the second parts are in a closed position, the side surfaces of the first and the second parts are flush with one another. In the presented embodiment the first connecting element 6 is placed on either of the side surfaces of the first part and the second connecting element 13 is placed on the inner side surface of the second part in the corresponding side of the device. The first connecting element 6 is a structure with a protruding grooving and the second connecting element 13 is a structure with tongues corresponding with the grooving of the first connecting element. When the two parts are moved to a closed position, the grooving in the first and the second parts will mesh and a connection between the connecting elements is established. Correspondingly, the connecting elements can be arranged on other surfaces of the device allowing the required vicinity for establishing the connection, e.g. in the side surface of the protruding plane in the first part and the side surface of the lid as shown in FIGS. 7a to 7b.

Figure 8:
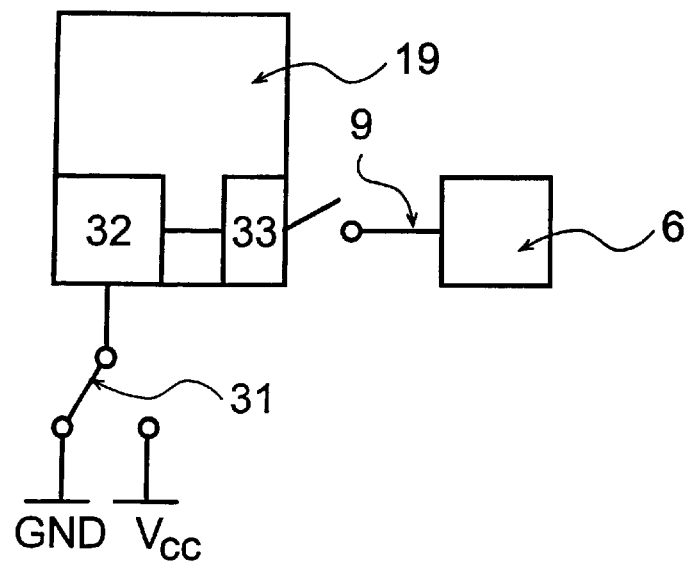
FIG. 8 illustrates another embodiment comprising an arrangement for protecting the circuitry of the device from unwanted electrical effects is presented.

When establishing electrical connections transient currents may appear. For electrostatic discharge (ESD) protection, the exposed connecting elements 6, 13 are preferably isolated from the other circuitry of the device. In FIG. 8, another embodiment of the invention comprising an arrangement for protecting the circuitry of the device from unwanted electrical effects is presented. The arrangement comprises a detection element 31, e.g. a mechanical switch incorporated in the hinge 4 for detecting the position of the lid 3. With the lid 3 in the open position, the detection element 31 connects an interrupt of a CPU 19 to a logic low level (GND). With the lid 3 in the closed position, the CPU interrupt is connected by the detection element 31 to a logic high level ($+V_{cc}$). Software controls the CPU 19 to provide a mode controller 32 which receives the signal placed on the CPU interrupt by the detection element 31. Software also causes the CPU 19 to provide a user interface controller 33 controlled by the mode controller 32. The first connecting element 6 is connected to the CPU and functionally to the user interface controller 33.

With the lid 3 open, the interrupt is set to logic low and the mode controller 32 controls the user interface controller 33 to disconnect the first connecting element 6 from the circuitry 10 in the first part (here the CPU 19) e.g. by arranging an interrupt in the lines 9 connecting the first connecting element 6 to the circuitry. When the lid 3 is closed, the interrupt is set to logic high and the mode controller 32 controls the user interface controller 33 to connect the first connecting element 6 to the circuitry 10. The effect is that the connection between the first connecting element 6 and the circuitry 10 in the first part is responsive to the position of the lid 3. Preferentially the user interface controller 33 is arranged to make the connection with a delay thus allowing time for the transient currents to disappear.

Figure 9A:
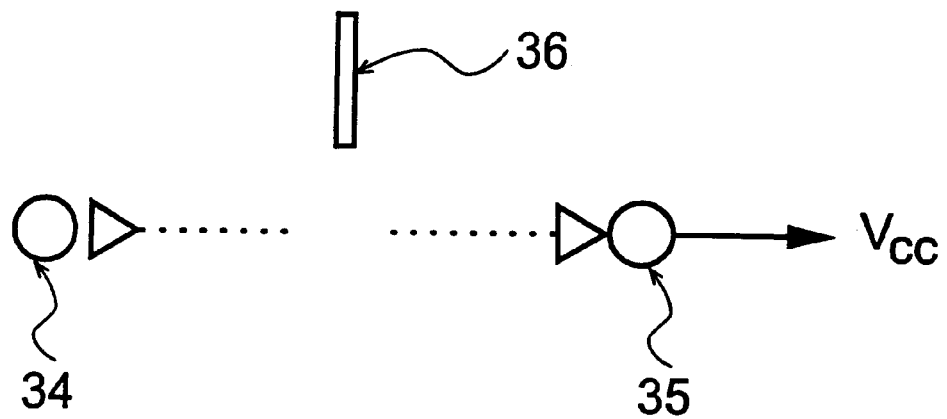
FIGS. 9a and 9b illustrate an arrangement for an optical switch.
Figure 9B:
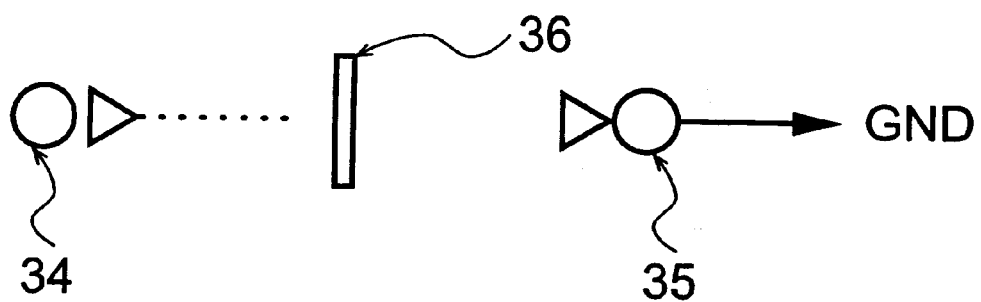

Other alternatives for implementing the detection element 31 are magnetic means (based on Hall effect) and optical means. An embodiment of an optical switch is presented in FIGS. 9a and 9b. The switch comprises an emitter 34 adapted to continually emit a beam of light to a direction of a detector 35. The detector 35 is sensible to light and as a response to detecting a beam of light from the emitter 34 is arranged to output a logic current V+. The element comprises also a shutter 36 that is connected to the movement of the first and the second part of the device.

As the parts are moved in a closed position, the shutter 36 is arranged to move in a position between the emitter and the detector thus blocking the beam of light from the emitter 34. As a response to not detecting the light from the emitter, the detector 35 is arranged to output a logic current $V_{GND}$. Corresponding optical arrangement can be utilised for implementing the first and second connecting elements wherein the connection is for signalling between the first and the second part. In such an arrangement no direct physical contact between the elements is required, as long as the vicinity allows detection of the emitted light and the positioning allows focusing of the light beam from the first connecting element to the second connecting element.

Although the invention has been shown and described in terms of a preferred embodiment, those persons of ordinary skill in the art will recognise modifications to the preferred embodiment may be made without departure from the scope of the invention as claimed below.

What is claimed is:

1. A portable communication device comprising
   a first part;
   a second part;
   coupling means for coupling the first and the second part and allowing a mutual movement about a hinged joint (AA) to at least an open position and a closed position;
   a connecting element of the first part on a surface of the first part;
   a connecting element of the second part on a surface of the second part; and
   said connecting elements are positioned to be against each other for enabling a mutual connection when the first part and the second part are in the closed position;
   wherein the device further comprises
   at least one data entry key in the second part; and
   the connection is arranged to deliver data entry key signals of the second part between the second part and the first part.

2. A device according to claim 1, wherein the first connecting element and the second connecting element are electrical connectors and said connection for delivering signals is an electrical connection.

3. A device according to claim 1, wherein the first connecting element and the second connecting element are optical connectors and said connection for delivering signals is an optical connection.

4. A device according to claim 1, wherein the first part is a main body of the device and the second part is a lid closing on the main body when the first part and the second part are in a closed position.

5. A device according to claim 4, wherein the surface of the first part is the front surface of the main body and surface of the second part is the rear surface of the lid.

6. A device according to claim 4, wherein the surface of the first part is the side surface of the main body and surface of the second part is the corresponding side surface of the lid.

7. A device according to claim 4, wherein the main body is provided with a recess in its lower surface, and the surface of the first part is the side of the recess of the main body.

8. A device according to claim 1, characterised in the device further comprises a detection element for detecting that the first part and the second part are in a closed position.

9. A device according to claim 8, characterised by control means for disconnecting the connection from the first connecting element to an electrical element in the first part as a response to the detection element not detecting the first and the second part being in a closed position.

10. A device according to claim 9, characterised by the control means being arranged to restore the disconnected connection to the first connecting element with a delay of predefined duration as a response to the detection element detecting the first and the second part being in a closed position.

11. A device according to claim 8, characterised by the detection element being an electrical switch.

12. A device according to claim 8, characterised by the detection element being an optical switch.

13. A device according to claim 1, characterised by the second part being pivotable to an open position wherein an opening angle ($\alpha$) between the first and the second part is over 180 degrees.

14. A device according to claim 1, wherein the at least one data entry key in the second part comprises several keys forming a keypad.

15. A device according to claim 14, wherein the connection is arranged to deliver signals between the keypad of the second part and the first part.

16. A device according to claim 1, wherein the mutual connection further comprises an electrical signal pathway when the first part and the second part are due in the closed position.

17. A device according to claim 1, wherein the connecting element of the first part and the connecting element of the second part are electrically connected together when the first part and the second part are in the closed position.

18. A device according to claim 1, wherein the connecting element of the first part and the connecting element of the second part create an electrical pathway across which data is transferred when the first part and the second part are in the closed position.

19. A method of delivering data entry key signals in a portable communication device comprising a first part, a second part comprising at least one data entry key, and a coupler for coupling the first and second part about a hinged joint (AA), the method comprising:
   allowing a mutual movement of the first and the second part about the hinged joint to move the device between an open position and a closed position;
   positioning a first connecting element on a surface of the first part;
   positioning a second connecting element on a surface of the second part;
   positioning the first and second connecting elements in relation to each other so that a signal pathway is established across the first and second connecting elements when the device is in the closed position; and
   delivering data entry key signals from the at least one data entry key of the second part to the first part over the signal pathway when the device is in the closed position.

20. The method of claim 19, wherein the first and second connecting elements are electrically connected together to allow the data entry key signals to pass from the second part to the first part.

* * * * *